United States Patent [19]

Klinkowski

[11] Patent Number: 4,758,319

[45] Date of Patent: * Jul. 19, 1988

[54] DIALYZING CROSSFLOW ELECTROFILTER WITH IMPROVED ELECTRODE

[75] Inventor: Peter R. Klinkowski, Norwalk, Conn.

[73] Assignee: Dorr-Oliver Incorporated, Stamford, Conn.

[*] Notice: The portion of the term of this patent subsequent to May 26, 2004 has been disclaimed.

[21] Appl. No.: 3,981

[22] Filed: Jan. 16, 1987

Related U.S. Application Data

[63] Continuation-in-part of Ser. No. 738,198, May 24, 1985, Pat. No. 4,668,361.

[51] Int. Cl.$^4$ ............................................ B01D 13/02
[52] U.S. Cl. .................... 204/182.3; 204/151; 204/182.4; 204/301; 210/748
[58] Field of Search .................. 204/151, 152, 182.1, 204/182.2, 182.3, 182.4, 301; 210/748, 243

[56] References Cited

U.S. PATENT DOCUMENTS

| | | | |
|---|---|---|---|
| 4,207,158 | 6/1980 | Freeman | 204/182.2 |
| 4,312,729 | 1/1982 | Wills | 204/301 |
| 4,604,174 | 8/1986 | Bollinger et al. | 204/151 |

Primary Examiner—Ivars Cintins
Attorney, Agent, or Firm—H. M. Snyder; Paul D. Greeley

[57] ABSTRACT

A membrane for dewatering a suspension of solids in a carrier liquid by means of either an electrically augmented vacuum filter (EAVF) or an electrically augmented crossflow device. The EAVF and crossflow devices both include an anodic structure comprising an anode, anolyte and a filter membrane for depositing or concentrating solids from the suspension of solids; and a cathodic structure comprising a cathode, catholyte, a catholyte chamber, and a filtrate chamber for filtering the filtrate of the bath of the suspension of solids. The catholyte chamber having a membrane wall which is liquid impervious and either an anion exchange membrane or a non ion selective membrane. Filtrate being removed at the filtrate chamber.

20 Claims, 4 Drawing Sheets

DIALYZING CROSSFLOW ELECTROFILTER WITH IMPROVED ELECTRODE

This application is a continuation-in-part of U.S. Ser. No. 738,198 filed May 24, 1985, now U.S. Pat. No. 4,668,361.

BACKGROUND OF THE INVENTION

The present invention relates to a process and apparatus for dewatering a suspension of solids in a carrier liquid by means of an electrically augmented vacuum filter (EAVF ®), a trademark of Dorr-Oliver Inc., including means for depositing solids from the bath of suspended solids onto an anodic structure and means for filtering filtrate from the bath of the suspension of solids at a cathodic structure, or by means of an electrically augmented crossflow (High Flow) filter device, including means for flowing solids in suspension between opposing electrodes to produce a flow of filtrate at the cathodic structure and a concentrated slurry of suspended solids near an anodic structure. The cathodic structure, in either the EAVF or crossflow devices, comprising a cathode, catholyte, catholyte chamber, and filtrate chamber. The catholyte chamber having a membrane wall which is an ion exchange membrane, means for introducing and removing catholyte from this catholyte chamber, and means for removing the filtrate from the filtrate chamber. The membrane wall of the catholyte chamber may include either a non ion selective membrane or an anion exchange membrane according to the present invention. Moreover, the double chambered structure may be applied to the anode if it is desired that the anode be used to filter the filtrate from a suspension of solids.

The use of an EAVF device for dewatering a suspension of solids in a carrier liquid is described in U.S. Pat. Nos. 4,168,222 and 4,207,158. These patents describe a means for dewatering a suspension of solids in an electric field which is controllably maintained between opposing electrodes, to cause the solids to migrate relative to the carrier liquid to form a layer or cake on one of the electrode structures in which the electrode elements are positioned within ion-pervious walls and immersed in a selected electrolyte, while allowing carrier liquid to be withdrawn under vacuum in the opposite direction through the liquid-pervious wall of a hollow, counter electrode structure, and wherein the layer or cake material may be detached from the first electrode structure during exposure from the suspension. The liquid-pervious wall of the electrode which is opposite the cake depositing electrode and which allows carrier liquid to be withdrawn therefrom under vacuum has the problem in that the filtrate drawn thru it is contaminated with the electrode reaction products. Also, the electrode having a liquid-pervious wall has a reduction in the flux of the filtration so that the amount of filtrate removed during a defined period of time is substantially reduced.

The use of a crossflow filtration device to concentrate a slurry of solids in suspension is described in the U.S. Pat. No. 4,604,174. This patent describes an electrically augmented crossflow filter device in which a feed stream containing solid particulate matter is flowed between opposed walls while a pressure differential is imposed across a first of said walls comprising a filter medium to produce a flow of filtrate there-through in a direction perpendicular to the direction of flow of the feed stream. At the same time, an electric field is imposed on the feed stream in a direction perpendicular to the direction of the flow of the feed stream, causing the solid particulate matter in the feed stream to tend to move toward the second of said walls which comprises an ion-pervious member such as an ion-exchange membrane. Unlike the EAVF device, cake formation on the latter ion-pervious walls of the crossflow device is limited or precluded by the velocity of the feed stream while the feed stream thickens in passing between the walls to form the product steam. Thus the filtrate from the feed stream is drawn through a liquid-pervious filter media disposed about the cathode, such that the cathodic structure of the crossflow device comprises a filter media, a filtrate chamber and a cathode element.

Typically, the filtrate withdrawal rate starts off very high, then drops to some equilibrium value after several days of operation. The filtrate rate will then be fairly constant, fluctuating based on variations in the feed composition, conductivity, and machine operating parameters. It is believed that the charged capillaries which are responsible for electro-osmotic pumping of filtrate became poisoned with hydroxide which was generated at the cathode. Thus, the high conductivity of hydroxide generated at the cathode surface diffuses into the capillary so that the filtrate rate declines. Because of the cathode assembly structure of earlier EAVF devices, where the cathode filter material is placed directly on a perforated electrode screen, it is felt that there are instances where back diffusion of hydroxide exceeds the forward flow of filtrate.

U.S. Pat. No. 4,312,729 (Wills) disclosed a cathodic structure comprising a catholyte chamber, perm-selective membrane and filtrate chamber. Wills attempted to prevent hydroxide generated from the cathodic reaction from passing into the feed slurry by providing a perm-selective membrane between the electrolyte chamber and the filtrate chamber. The cation selective membrane according to Wills attempts to prevent contamination of the feed suspension of filter cake with hydroxide and other ions which are deliterious to the suspension of the slurry. The perm-selective membranes of Wills are those membranes permeable to cations and substantially impermeable to anions, gases, water and other liquid.

The disadvantage of Wills is that the cation exchange membrane results in an extremely dialyzed filtrate. Since hydroxide cannot pass thru the cation exchange membrane from the electrode chamber to the filtrate chamber, cations must pass from the filtrate to the electrode chamber. This is required to satisfy the physical law of charge neutrality. There cannot be an excess of positive or negative ions. Hydroxide is generated at the cathode, and to satisfy charge neutrality, there must either be a corresponding flow of hydroxide towards the anode, or a corresponding flow of cations towards the cathode. The dialyzed filtrate results in an extremely high voltage drop across the filtrate chamber due to low conductivity and polarization layers. All the electrical current flow was forced by the cation exchange membrane to be carried across the boundary by positive ions. The high voltage drop is not desirable due to its increased energy consumption.

The use of cation exchange membranes as shown in Wills and what was known by those skilled in the art in effect taught away from the use of an anion exchange membrane in a double chambered electrode for removing filtrate since it was expected that the filtrate would be enriched with hydroxide ions being transported through the membrane into the filtrate, which would poison the electro-osmotic pumping of the electrode which Wills attempted to avoid. However, the present inventor observed that the membrane and electrode structure of the present invention permits the filtrate to become enriched in anions, sufficient to satisfy charge neutrality but low in conductivity and near neutral pH which was unexpected.

Based upon extensive testing of different membrane structures the present invention overcomes the following disadvantages of the prior art: contamination of electrolyte, reduction in the flow rate of filtrate, dialyzing of the filtrate, and high voltage drop across the filtrate chamber due to low conductivity and polarization layers.

This and other advantages of the present invention will come clear as described below.

SUMMARY OF THE INVENTION

It is a primary object of the present invention to provide a method for dewatering a suspension of solids in a carrier liquid by means of either an EAVF or crossflow device. In particular, it is an object of the present invention to provide an EAVF or crossflow device which includes an anodic structure comprising an anode, anolyte and a membrane for depositing or concentrating solids from the suspension of solids; and a cathodic structure comprising a cathode, catholyte, catholyte chamber and filtrate chamber for filtering the filtrate of the bath or feed stream of the suspended solids. The catholyte chamber, according to the present invention, has a membrane wall which is either an anion exchange membrane or a non ion selective membrane.

It is a further object of the present invention to provide means for removing filtrate from the filtrate chamber and for recirculating the catholyte to the anodic structure and anolyte to the cathodic structure.

Also, it is an object of the present invention to provide a filtrate chamber comprising a filter media which is both liquid pervious and acts as a positive barrier to solids being filtered. The filter media of the filtrate chamber may be supported by a grid positioned within the filtrate chamber itself.

Additionally, it is the object of the present invention to provide that the membrane of the catholyte chamber be impervious to the liquid. The anion exchange membrane is prepared from an anion exchange resin and binder, and the non ion selective membrane is prepared from a mixture comprising a anion exchange resin, a cation exchange resin and a binder.

It is a further object of the present invention wherein the cathodic structure may be used for depositing or concentrating solids of a suspension and the anodic structure used for filtering the filtrate of the bath or feed stream. In this instance the anodic structure would include an anolyte chamber and a filtrate chamber similar to that discussed when the cathodic structure is used for removing filtrate from the bath or feed stream. The membrane in the anolyte chamber would be selected from the group consisting of an anion exchange membrane, a cation exchange membrane and non ion selective membrane.

Also it is an object of the present invention to provide a cathodic structure wherein a filtrate chamber is formed between an outer membrane wall of a catholyte chamber and a filter media, the filter media being in contact with a suspension of solids to be dewatered. The filter media is liquid pervious to allow filtrate of the suspension of solids to enter into the filtrate chamber for removal therefrom, but is impermeable to the solids in the bath or feed stream. In accordance with the present invention, the use of a filtrate chamber and catholyte chamber prevents the filtrate from being contaminated and the filtrate from having increased conductivity and pH. Thus, the catholyte does not have to be continuously replenished, resulting in substantial cost savings and a more desirable filtrate is obtained. Furthermore, the use of a recirculating electrolyte system also decreases the amount of electrolyte to be replenished.

In accordance with the present invention the ion exchange membrane of the catholyte structure should be in non-contact with the cathode. More specifically, the electrolyte must flow between the cathode and the ion exchange membrane to sweep away the electrode reaction products, e.g. hydroxide. In the case of recycled electrolyte, this allows the acid from the anode to neutralize the base from the cathode. This also assists in preventing hydroxide ions from being transported into the filtrate chamber. If, however, the anion exchange membrane rests on the cathode, local concentrations of hydroxide form adjacent to the membrane, such that the transport across the membrane into the filtrate is predominantly hydroxide ions which is undesirable. This is because the filtrate will have an increased pH level. Concurrently, the electrolyte would be depleted overall in hydroxide, causing its pH to drop which is also undesirable. Thus, it is preferable that the cathodic structure according to the present invention be designed to force flow of electrolyte between the electrode and the ion exchange membrane.

The present invention may also include many additional features which shall be further described below.

DESCRIPTION OF THE PREFERRED EMBODIMENT

The use of a double chamber cathodic structure wherein the catholyte chamber comprises a cation exchange membrane is disclosed in U.S. Pat. No. 4,312,729, issued Jan. 26, 1982. Our invention is an improvement over that disclosure, wherein the present invention provides a cathodic structure for dewatering a suspension of solids in a carrier liquid by means of either an EAVF or crossflow device, wherein either an anion exchange membrane or a non ion selective membrane is used as the membrane wall of the catholyte chamber. The primary object of the present invention is to avoid a dialyzed filtrate which occurs during use of the cation exchange membrane of the prior art. The present invention permits the transfer of anions into the filtrate while maintaining a fairly neutral pH and low conductivity. Contrary to what was taught in U.S. Pat.

No. 4,312,729 hydroxide ions do not necessarily mass migrate into the filtrate but can be made to remain in the electrolyte of the catholyte chamber. The hydroxide generated at the cathode can be recirculated to neutralize the acid produced in the electrolyte of the anodic structure.

The present invention therefore allows anions, but limits hydroxide ions, to migrate into the filtrate thereby preventing dialyzing of the filtrate and high voltage drop across the filtrate chamber due to low conductivity and polarization layers.

The cathodic structure according to the present invention can be used in an EAVF system for dewatering the suspension of solids in a carrier liquid as shown in U.S. Pat. No. 4,168,222, issued Sept. 18, 1979 and U.S. Pat. No. 4,207,158, issued June 10, 1980, wherein at least a pair of self-contained mutually opposed electrode structures positioned in a tank containing a suspension of solids, one electrode being a cathodic electrode structure and the other an anodic electrode structure having between them a controllable electrical field, while submerged in a suspension. If the solids of the suspension have a negative charge then a cake of the solids will be formed on the membrane wall of the anodic structure, the membrane of the anode being at least one selected from the group consisting of anion exchange membranes, cation exchange membranes or non ion selective membranes. The cathodic structure having a filtrate chamber and a catholyte chamber removes filtrate from the bath without contaminating the electrolyte. In a preferred embodiment according to the present invention the catholyte and anolyte can be recirculated in order to reduce the amount of electrolyte solutions added to the electrode structures during operation.

Another embodiment of the present invention positions an anodic structure between a pair of cathodic structures for depositing the solids of the suspension on both sides of the anodic structure.

Figure 1:
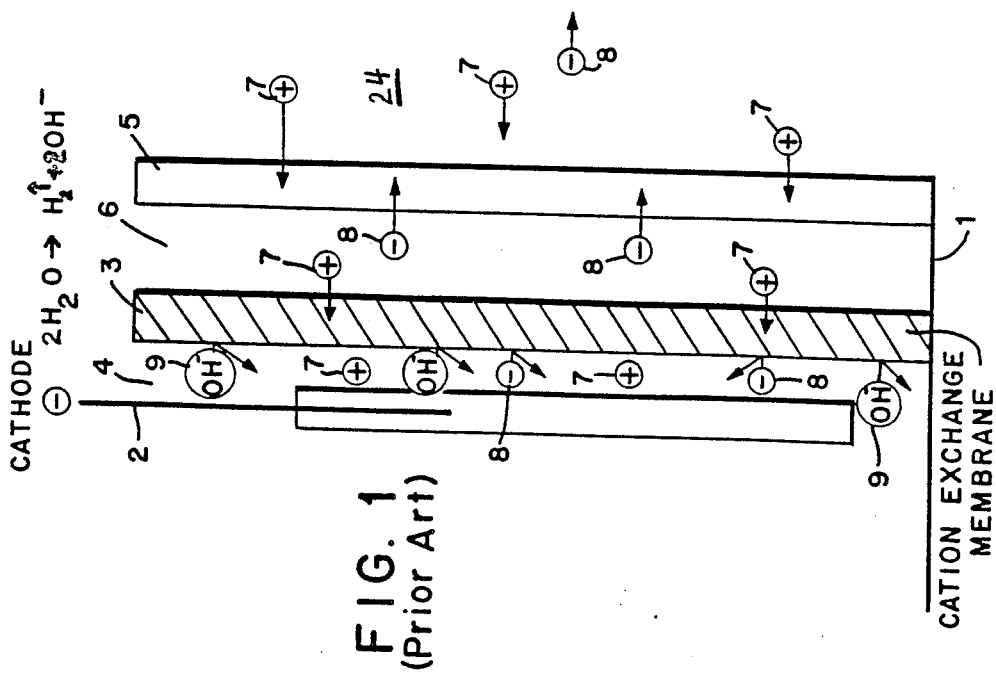
FIG. 1 is a sectional view of a cathodic structure known in the prior art containing a cation exchange membrane.

FIG. 1 is a graphic representation of a cation exchange membrane wall 3 in a cathodic structure 1 according to the prior art. The cathodic structure 1 of FIG. 1 includes a cathode 2 which is electrically connected to a negative terminal, cation exchange membrane 3 forms a catholyte chamber 4, and liquid pervious filter media 5 which forms a filtrate chamber 6. Filter media 5 permits free flow of both cations and anions, 7 and 8, respectively, as well as the filtrate from a bath 24. The cation exchange membrane 3 permits cations 7 contained within the filtrate chamber 6 to pass therethrough into the catholyte chamber 4 to react at cathode 2. Cation exchange membrane 3 does not, however, permit passage of either anions 8 or hydroxide ions 9. The electrical current flow is therefore forced by the cation exchange membrane 3 to be carried across by cations only. This results in an extremely dialyzed filtrate since negative ions must transport out of the filtrate into the bath to maintain charge neutrality. The net affect is a dialyzed filtrate creating an extremely high voltage drop across the filtrate chamber due to low conductivity and polarization layers, the economics of which are undesirable.

Figure 2:
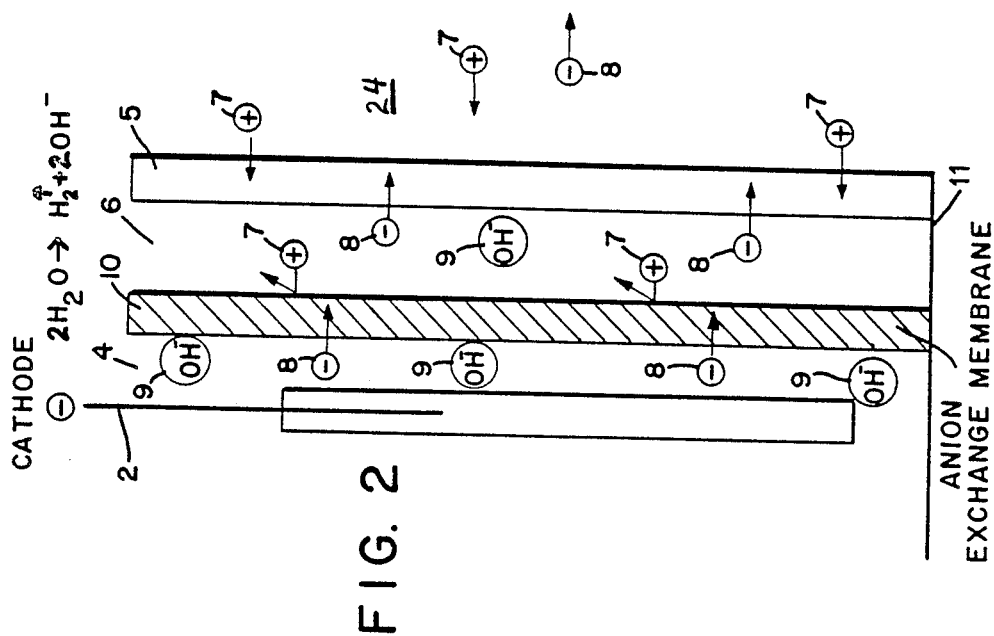
FIG. 2 is a sectional view of a cathodic structure according to the present invention comprising an anion exchange membrane.

FIG. 2 graphically describes the cathodic structure according to the present invention, wherein the membrane used to define the catholyte chamber 4 is anion exchange membrane 10. It should be noted that a non ion selective membrane may also be used in place of anion exchange membrane 10 according to the present invention. In this instance, anions 8 in the catholyte chamber 4 may pass through anion exchange membrane 10 into filtrate chamber 6 due to membrane permeability and attraction to the electrical pull of the anode. The anions may continue to pass thru filter media 5 into bath 24. When using an anion exchange membrane 10 cations 7 in filtrate chamber 6 are unable to pass through membrane 10 and remain in filtrate chamber 6. In some instances, it may be desirable to use a non ion exchange membrane in place of anion exchange membrane 10 in order to permit passage of both anions and cations in order to reduce the amount of cations in filtrate chamber 6.

Although hydroxide ions 9 are anions and should be able to pass through anion exchange membrane 10, it has been observed by the present inventor that under certain conditions, hydroxide ions tend to remain in the catholyte and do not pass between anion exchange membrane 10 into filtrate chamber 6. It is this phenomenon which permits the conductivity of the filtrate in filtrate chamber 6 to remain quite low and the pH of the filtrate to remain near neutral. Thus, it appears that most of the transport through anion exchange membrane 10 is by anions 8 other than hydroxide ions 9. The hydroxide ions in the catholyte are recirculated to neutralize the acid of the anolyte. It is important according to the present invention that cathode 2 not contact anion exchange membrane 10 in order to avoid local concentrations of hydroxide ion 9 from forming adjacent to membrane 10 and transporting across membrane 10 into filtrate chamber 6 which would increase both the pH and conductivity of the filtrate. Also, the catholyte would be depleted of hydroxide ions resulting in its pH dropping to an undesirable level. Conversely, if the catholyte is not recirculated to neutralize the anolyte acid, the hydroxide level will increase and eventually reach a concentration where primarily anions would be transported across membrane 10.

Figure 3:
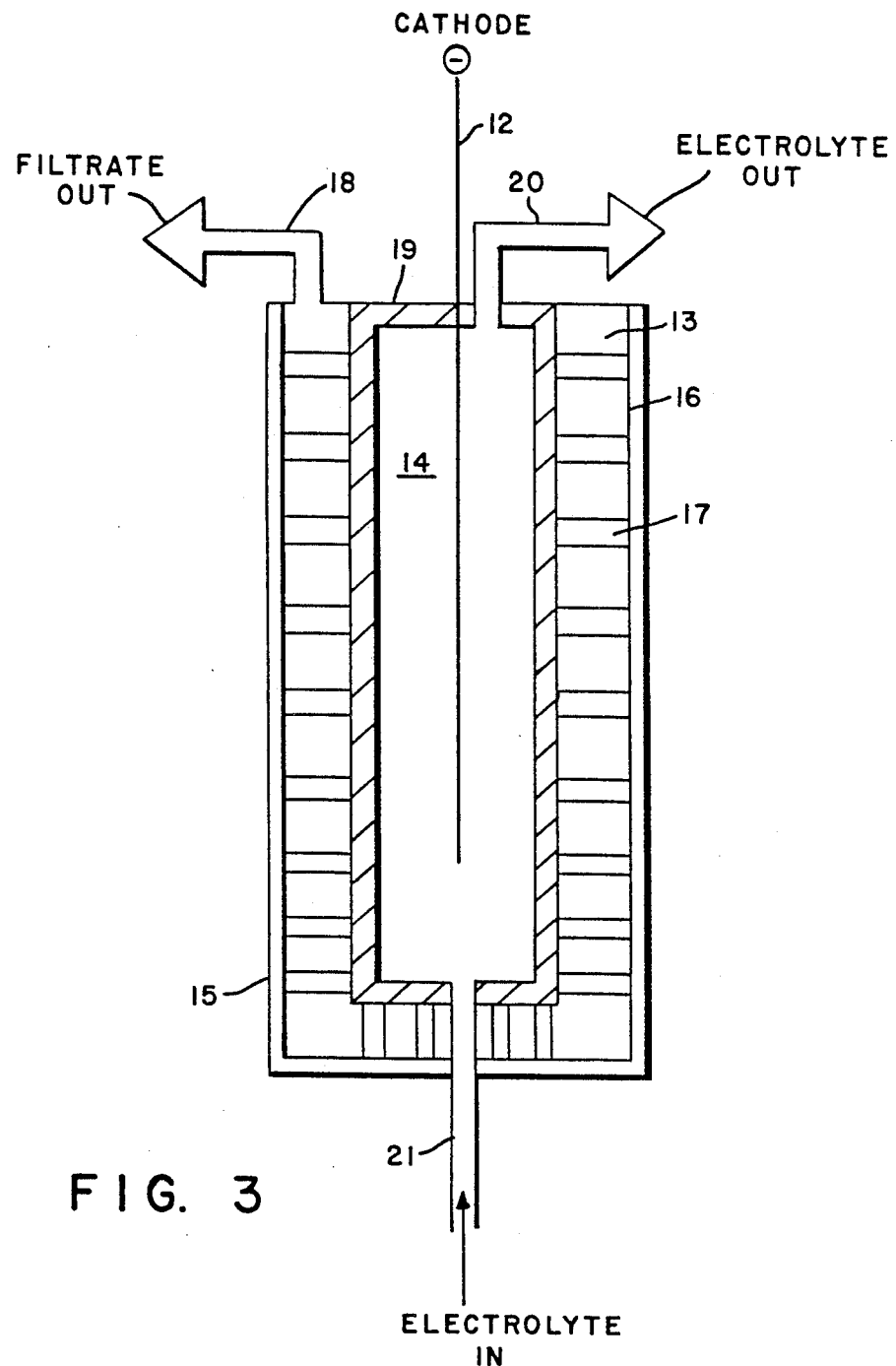
FIG. 3 is a sectional view of an embodiment according to the present invention.

FIG. 3 provides a cathodic structure according to the present invention comprising a cathode 12, filtrate chamber 13 and catholyte chamber 14. Filtrate chamber 13 comprises a liquid pervious filter media 16 and, optionally, a support grid 17. The liquid pervious filter media 16 is permeable to both anions and cations but impermeable to solids of the suspension.

Figure 4:
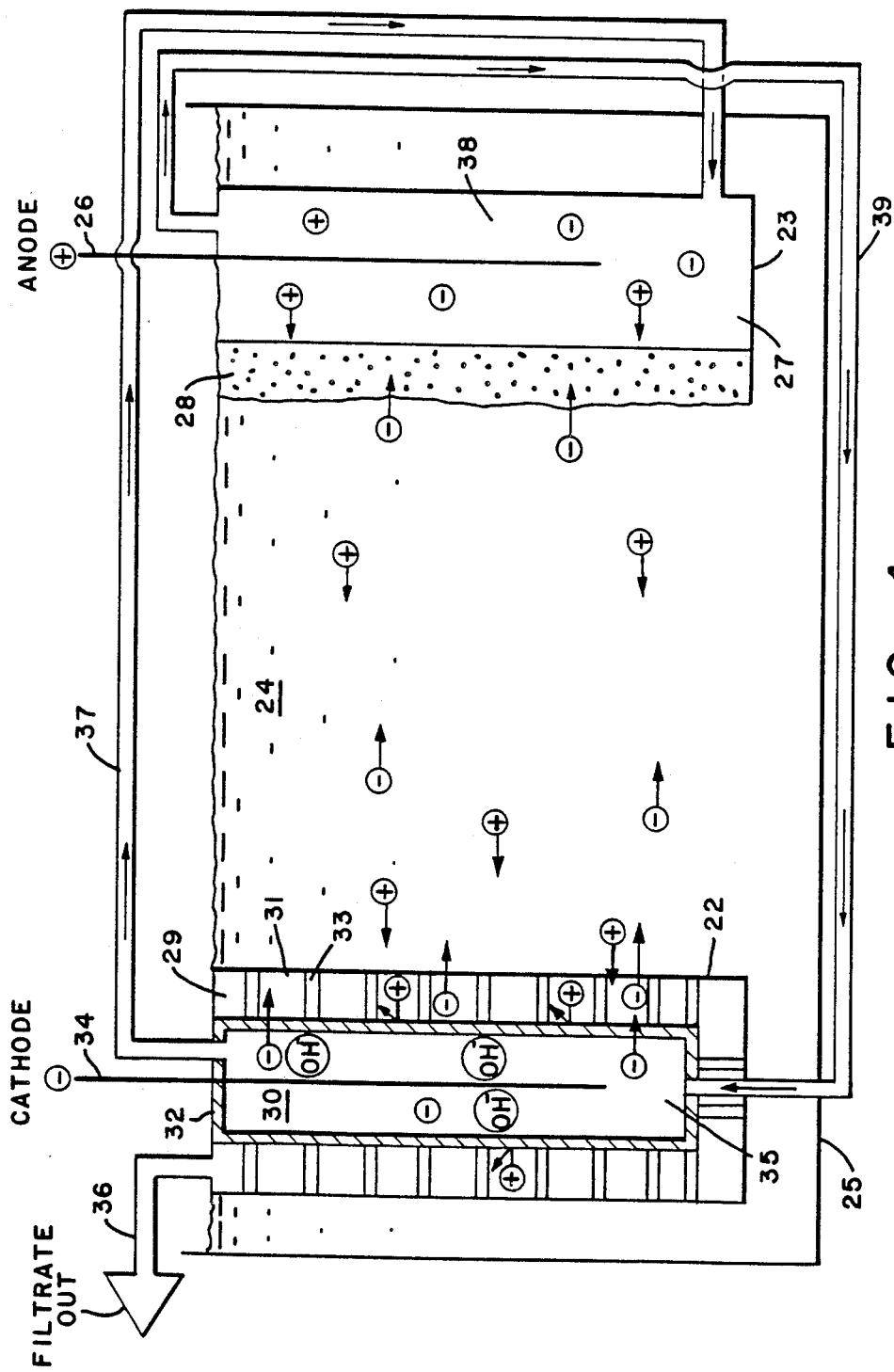
FIG. 4 is a sectional view of an EAVF system according to the present invention.

Furthermore, FIG. 4 describes recycling of electrolyte from cathode to anode and from anode to cathode which preserves electrolyte and avoids continuous replenishing of the electrolyte therein.

FIG. 4 provides a cathodic structure 22 and an anodic structure 23 being submerged in a bath 24 of a suspension of solids in a carrier liquid contained in tank 25. The anodic structure comprising an anode 26 and membrane 27 containing anolyte 38 therein. Membrane 27 is liquid impervious and may be selected from the group consisting of anion exchange membranes, cation exchange membranes, non ion selective membranes and any other liquid impervious membrane. Solids of the solution form a cake 28 on membrane 27 which may be removed by doctoring or blow back when the anodic structure is extracted from the bath 24. Cathodic structure 22 includes a filtrate chamber 29 and a catholyte chamber 30. The filtrate chamber 29 is formed between a liquid pervious filter media 31, the outer surface of which is in contact with bath 24, and membrane wall 32 of the catholyte chamber. A support grid 33 may be placed within the filtrate chamber 29 to support the liquid pervious filter media 31. The catholyte chamber 30 is formed by membrane 32 which is in noncontact with cathode 34 and contains catholyte 35 therein.

The filtrate contained within filtrate chamber 29 is removed from cathodic structure 22 via conduit 36 by conventional vacuum means. The filtrate having low conductivity and a relatively neutral pH. The catholyte 35 is recirculated via conduit 37 to anolyte 38 of anodic structure 23 in order to neutralize the acid produced by the reaction of anolyte 38 at anode 26. It is withdrawn from anodic structure 23 via conduit 39 and recirculated to catholyte chamber 30 of cathodic structure 22. It should be noted that recirculation of the electrolyte between the cathode and the anode is not 100% efficient. The electrolyte still requires replenishing from time to time. It may also be desirable to recirculate the catholyte by itself and the anolyte by itself for polarization control within the catholyte and anolyte chambers, respectively.

Figure 5:
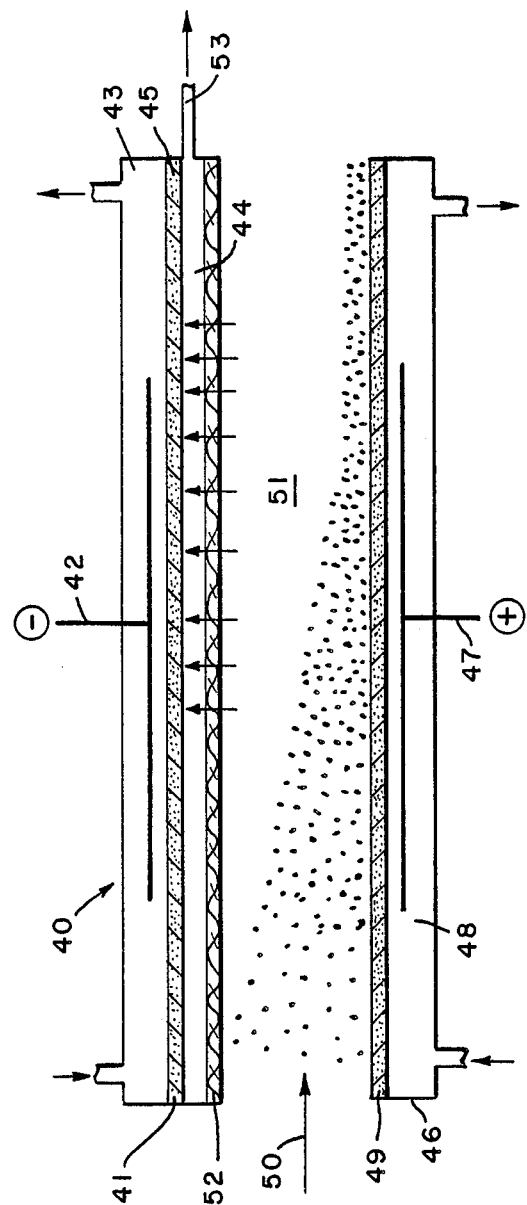
FIG. 5 is a sectional view of a crossflow electrofiltration device according to the present invention.

FIG. 5 depicts another embodiment according to the present invention, wherein a double chambered cathodic structure 41 is included in crossflow electrofiltration assemble 40. The double chambered cathodic structure comprises a cathode 42, a catholyte chamber 43, and a filtrate chamber 44. Catholyte chamber 43 is separated from filtrate chamber 44 by an ion pervious wall 45. Ion pervious wall 45 may be either an anion exchange membrane or a non ion exchange membrane. Opposite double chambered cathodic structure 41 is anodic structure 46 comprising anode 47 and anolyte chamber 48. Anolyte chamber 48 is formed by ion permeable, liquid impervious membrane 49.

Crossflow electrofiltration assembly 40 is operated as follows. A feed stream 50 of solids in suspension is flowed through feed channel 51 at a predetermined velocity. Feed channel 51 is formed between double chambered cathodic structure 41 and anodic structure 46. Simultaneously an electric field is generated between structures 41 and 46 causing the solids in suspension to migrate toward anodic structure 46 due to the electrophoretic effect on the solid particles. Thus a concentrated slurry of solids is exhausted at the opposite end of feed channel 51. While the solid particles concentrate at anodic structure 46, filtrate is withdrawn from feed channel 51 through liquid pervious filter media 52. The filtrate is removed from filtrate chamber 44 via port 53. Ion pervious wall 45 is substantially impervious to filtrate, such that the filtrate does not contaminate the catholyte in catholyte chamber 43.

According to the present invention it may also be desirable to filter filtrate at the anodic structure and concentrate solids at the cathodic structure. In that case, the anodic structure comprises an anode, an anolyte chamber formed by an ion pervious wall, and a filtrate chamber.

EXAMPLE I

A cathodic structure according to the present invention was prepared having a filtrate chamber wall of a liquid impervious microporous membrane made of any conventional filter material which is a positive barrier to the solids being filtered and which would not limit the flux due to hydraulic resistance. Normally, Dynel TM cloth was used as the filter media but the port size in the Dynel was larger than the particles it was holding back which permitted particles to enter the filtrate chamber contaminating the filtrate. In the past there was a small film or gel of particles which formed on the Dynel which acted as a precoat, filtering out other particles before they got to the pores. However, when the filtrate pH is kept neutral, this precoat formation is substantially delayed or prevented. That is because it was the back diffusion of the hydroxide ions which caused a precoat cake to establish in the first place. And since the cathodic structure of the present invention has virtually eliminated back diffusion of hydroxide ion due to its double chamber the filtrate chamber must now use a filter media which is a positive barrier to the solids being filtered, e.g. a 0.45 micron AMF nylon membrane cast on a polyester support.

The membrane wall of the catholyte chamber can be either an anionic ion exchange membrane or a non ion selective membrane. One preferred membrane is dynel filter cloth impregnated with an anion exchange resin and secured thereto by means of organic binder. This membrane is both liquid and cation impervious, but anion pervious. Alternatively, a non ion selective membrane could be formed by impregnating dynel filter cloth with a mixture of cation exchange resin and anion exchange resin in a binder. The aforementioned cathodic structure was placed in a bath of a suspension of solids in a carrier liquid opposite an anodic structure and demonstrated the results shown in Table I below.

TABLE I

| | CATHODIC STRUCTURE USING ANION EXCHANGE MEMBRANE | | | | |
|---|---|---|---|---|---|
| Time (Min) | Filtrate Rate (lb/hr) | Conductivity of Filtrate | Conductivity of Electrolyte | pH Filtrate | pH Electrolyte |
| 0 | 27 | 2000 | 87000 | 7 | 8.5 |
| 30 | 25 | 2000 | 68000 | 7 | 10.5 |
| 60 | 27 | 2000 | 63000 | 7 | 10.5 |
| 90 | 22 | 2000 | 63000 | 7 | 10.5 |
| 120 | 21 | 2000 | 63000 | 7 | 10.5 |

Review of Table I demonstrates that over time the conductivity of the filtrate remained constant at approximately 2000 micromhos/am. Thus, the conductivity of the filtrate remained relatively low which is desirable. Moreover, the conductivity of the electrolyte remained fairly constant throughout the filtering process. The test also demonstrated that the pH of the filtrate was relatively neutral at approximately 7. The pH of the electrolyte was approximately 10.5 reflecting the increase of hydroxide ions therein. A neutral pH of the filtrate demonstrates that the filtrate has not dialyzed as was the problem with the prior art and also that hydroxide ion concentration is very low, due to the fact that it is believed they remain within the catholyte chamber. Thus, it is the other anions in the catholyte which transport through the ion exchange membrane of the catholyte chamber into the filtrate to maintain a neutral pH, not hydroxide ions. Over the course of the 120 minutes in which the dewatering test was run on the cathodic structure using the anion exchange membrane according to the present invention the filtrate rate (lbs/hrs) remained fairly constant which is preferable. The suspension of solids supplied into the dewatering tank consisted of a 30% solids slurry of polyvinyl chloride PVC at approximately 1100 micromho conductivity.

EXAMPLE II

An EAVF device was tested first with a cathodic structure of the prior art, i.e. a single filtrate/electrolyte chamber, and then with the double chambered cathodic structure according to the present invention. The following parameters were used in both test runs:

1. Feed—PVC latex
2. Current density—20 amps/sq ft
3. Product solids—82%
4. Anode membranes—PB-100 (Dorr-Oliver Inc.)

The dewatering surface of the single chambered cathodic structure was a dynel cloth, while the filtrate chamber wall of the cathodic structure of the present invention was 0.45 micron nylon with a polyester support. Moreover, the membrane of the catholyte chamber was an anion exchange membrane.

Table II compares the data and results obtained during each test run.

TABLE II

|  | PRESENT INVENTION Double Chamber | STANDARD Single |
|---|---|---|
| Filtrate | crystal clear from the start | cloudy throughout run |
| Filtrate rate (lb/hr) | 16.5 | 2.3 |
| Electrode gap (inches) | 1½ | 1.0 |
| Product rate (lb dry/hr sq ft) | 32.7 | 4.5 |
| Voltage | 76 | 25 |
| Kwhr/dry ton | 93 | 222 |
| Anode size (sq ft) | 108 | 777 |
| Operating cost EAVF ($/dry ton) | $3.41 | $12.19 |

As evidenced in Table II the filtrate of the present invention was not cloudy such as that obtained during dewatering with the standard single chambered cathodic structure. Also the filtrate rate of the standard cathodic structure was substantially reduced due to back flow of hydroxide ions which reduced the electrosmotic pumping of the pores therein, whereas the filtrate rate of the cathodic structure of the present invention remain relatively high. The cake depositing (product) rate of the present invention was substantially higher than the prior art device, while the operating cost of the EAVF device per dry ton of product was approximately four times higher for the prior art cathodic structure than for the cathodic structure of the present invention.

EXAMPLE III

A crossflow electrofilter device similar to FIG. 5 was tested, first with the cation exchange membrane according to the prior art being disposed between the filtrate and electrolyte chambers, and secondly with the anion exchange membrane according to the present invention being disposed between the filtrate and electrolyte chambers. In both cases the catholyte was recirculated to the anode chamber, and the anolyte recirculated to the cathode chamber. The following parameters were used in both tests:

| feed material | coating grade kaolin slurry |
|---|---|
| feed solids | approximately 60% |
| channel height | 0.125 inches |
| channel width | 5.5 inches |
| filter media | Versapor 0.45 micron |
| electrolyte | 30,000 micromho sodium sulfate |
| crossflow velocity | 8.4 fps |
| current density | 4 asf |
| pressure | 27 psi |

Table III compares the summary data from the tests.

TABLE III

|  | test 1 (PRIOR ART) | test 2 (PRESENT INVENTION) |
|---|---|---|
| catholyte membrane | cationic | anionic |
| filtrate conductivity | 2900 micromhos | 8500 micromhos |
| filter pH | 6.39 | 6.36 |
| electrolyte pH initial | 6.19 | 6.64 |
| electrolyte pH final | 10.59 | 6.39 |
| feed pH initial | 6.3 | 6.5 |
| concentrate pH final | 6.4 | 6.5 |

As evidenced by the test results, the pH of the filtrate was not appreciably different between using the cathionic or anionic membranes. The conductivity of the filtrate was higher with the anionic membrane; however, it is much less than the 30,000 michomho conductivity of the catholyte. Since the conductivity is higher in the filtrate using the anionic membrane, the power loss in the filtrate is less than half that of the prior art. Yet the conductivity is still low enough not to constitute a pollution hazard.

What is claimed is:

1. A process for dewatering a suspension of solids in a carrier liquid using an electrically augmented crossflow filter comprising:
    concentrating solids from said suspension of solids in the vicinity of an anodic structure, said anodic structure comprising an anode, an anolyte chamber formed by a membrane, and anolyte;
    filtering a filtrate from said carrier liquid and said suspension of solids at a cathodic structure, said cathodic structure comprising a cathode, catholyte, a catholyte chamber, and a filtrate chamber, said catholyte chamber having a wall which is an anion exchange membrane which is permeable to anions, but impermeable to cations; and
    removing said filtrate from said filtrate chamber.

2. A process for dewatering a suspension of solids according to claim 1, wherein said filtrate chamber is formed by a liquid pervious filter media.

3. A process for dewatering a suspension of solids according to claim 2, wherein said filter media of said filtrate chamber is supported by a grid positioned inside said filtrate chamber.

4. A process for dewatering a suspension of solids according to claim 2, wherein said filter media of said filtrate chamber is a positive barrier to the solids being filtered.

5. A process for dewatering a suspension of solids according to claim 2, wherein said filter media is a microporous membrane.

6. A process for dewatering a suspension of solids according to claim 1, wherein said anion exchange membrane is impervious to liquid.

7. A process for dewatering a suspension of solids according to claim 1, wherein said anion exchange membrane is not in contact with said cathode.

8. A process for dewatering a suspension of solids according to claim 1, wherein said catholyte and said anolyte are recirculated.

9. A process for dewatering a suspension of solids according to claim 8, wherein said anolyte is recirculated into said catholyte chamber and said catholyte is recirculated into said anolyte chamber.

10. A process for dewatering a suspension of solids in a carrier liquid using an electrically augmented crossflow filter comprising:

concentrating solids from said suspension of solids in the vicinity of an anodic structure, said anodic structure comprising an anode, an anolyte chamber formed by a membrane, and anolyte;

filtering a filtrate from said carrier liquid and said suspension of solids at a cathodic structure, said cathodic structure comprising a cathode, catholyte, a catholyte chamber, and a filtrate chamber, said catholyte chamber having a wall which is non ion selective membrane and which is permeable to both anions and cations; and removing said filtrate from said filtrate chamber.

11. A process for dewatering a suspension of solids according to claim 10, wherein said non ion selective membrane is formed from a mixture comprising an anion exchange resin, a cation exchange resin and a binder.

12. A process for dewatering a suspension of solids in a carrier liquid using an electrically augmented cross-flow filter comprising:

concentrating solids from said suspension of solids in the vicinity of a cathodic structure, said cathodic structure comprising a cathode, a catholyte chamber formed by a membrane, and catholyte;

filtering a filtrate from said carrier liquid and said suspension of solids at an anodic structure, said anodic structure comprising an anode, anolyte, an anolyte chamber formed by a membrane wall, and a filtrate chamber, said anolyte chamber having a membrane wall which is liquid impervious; and removing said filtrate from said filtrate chamber.

13. A process for dewatering a suspension of solids according to claim 12, wherein said wall of said anolyte chamber is a membrane selected from the group consisting of anion exchange membranes, cation exchange membranes and non ion selective membranes.

14. A process for dewatering a suspension of solids according to claim 12, wherein said filtrate chamber is formed by a liquid pervious filter media.

15. A process for dewatering a suspension of solids according to claim 14, wherein said filter media of said filtrate chamber is supported by a grid positioned inside said filtrate chamber.

16. A process for dewatering a suspension of solids according to claim 14, wherein said filter media of said filtrate chamber is a positive barrier to the solids being filtered.

17. A process for dewatering a suspension of solids according to claim 14, wherein said filter media is a microporous membrane.

18. A process for dewatering a suspension of solids according to claim 12, wherein said wall of said anolyte chamber is not in contact with said anode.

19. A process for dewatering a suspension of solids according to claim 12, wherein said catholyte and said anolyte are recirculated.

20. A process for dewatering a suspension of solids according to claim 19, wherein said anolyte is recirculated into said catholyte chamber and said catholyte is recirculated into said anolyte chamber.

* * * * *